(12) United States Patent
Koo

(10) Patent No.: US 11,834,342 B2
(45) Date of Patent: Dec. 5, 2023

(54) METHOD OF PREPARING IONIZED CALCIUM OXIDE POWDER

(71) Applicant: Dong Chan Koo, Seongnam-si (KR)

(72) Inventor: Dong Chan Koo, Seongnam-si (KR)

( * ) Notice: Subject to any disclaimer, the term of this patent is extended or adjusted under 35 U.S.C. 154(b) by 534 days.

(21) Appl. No.: 17/155,119

(22) Filed: Jan. 22, 2021

(65) Prior Publication Data
US 2021/0238050 A1    Aug. 5, 2021

(30) Foreign Application Priority Data

Jan. 30, 2020    (KR) .................. 10-2020-0011175

(51) Int. Cl.
| | |
|---|---|
| *B01J 20/24* | (2006.01) |
| *C01F 11/06* | (2006.01) |
| *C25B 1/50* | (2021.01) |
| *C01F 11/16* | (2006.01) |
| *C25B 1/18* | (2006.01) |
| *C25B 15/02* | (2021.01) |

(52) U.S. Cl.
CPC .............. *C01F 11/06* (2013.01); *C01F 11/16* (2013.01); *C25B 1/18* (2013.01); *C25B 1/50* (2021.01); *C25B 15/02* (2013.01)

(58) Field of Classification Search
None
See application file for complete search history.

(56) References Cited

FOREIGN PATENT DOCUMENTS

| | | | |
|---|---|---|---|
| CN | 105854823 A | * | 8/2016 |
| KR | 10-2003-0006199 | | 1/2003 |
| KR | 10-1463884 | | 11/2014 |
| KR | 10-2015-0137770 | | 12/2015 |

OTHER PUBLICATIONS

Jiang et al, an English translation for CN 105854823 A (Year: 2016).*

* cited by examiner

*Primary Examiner* — Yun Qian
(74) *Attorney, Agent, or Firm* — CANTOR COLBURN LLP

(57) ABSTRACT

A method of preparing an ionized calcium oxide powder is provided, including steps of washing and drying shellfish, pulverizing the shellfish into a powder, subjecting the powder to a heat treatment, subjecting the powder to an electrolysis treatment, and subjecting the powder to an ultrasonic treatment.

3 Claims, 1 Drawing Sheet

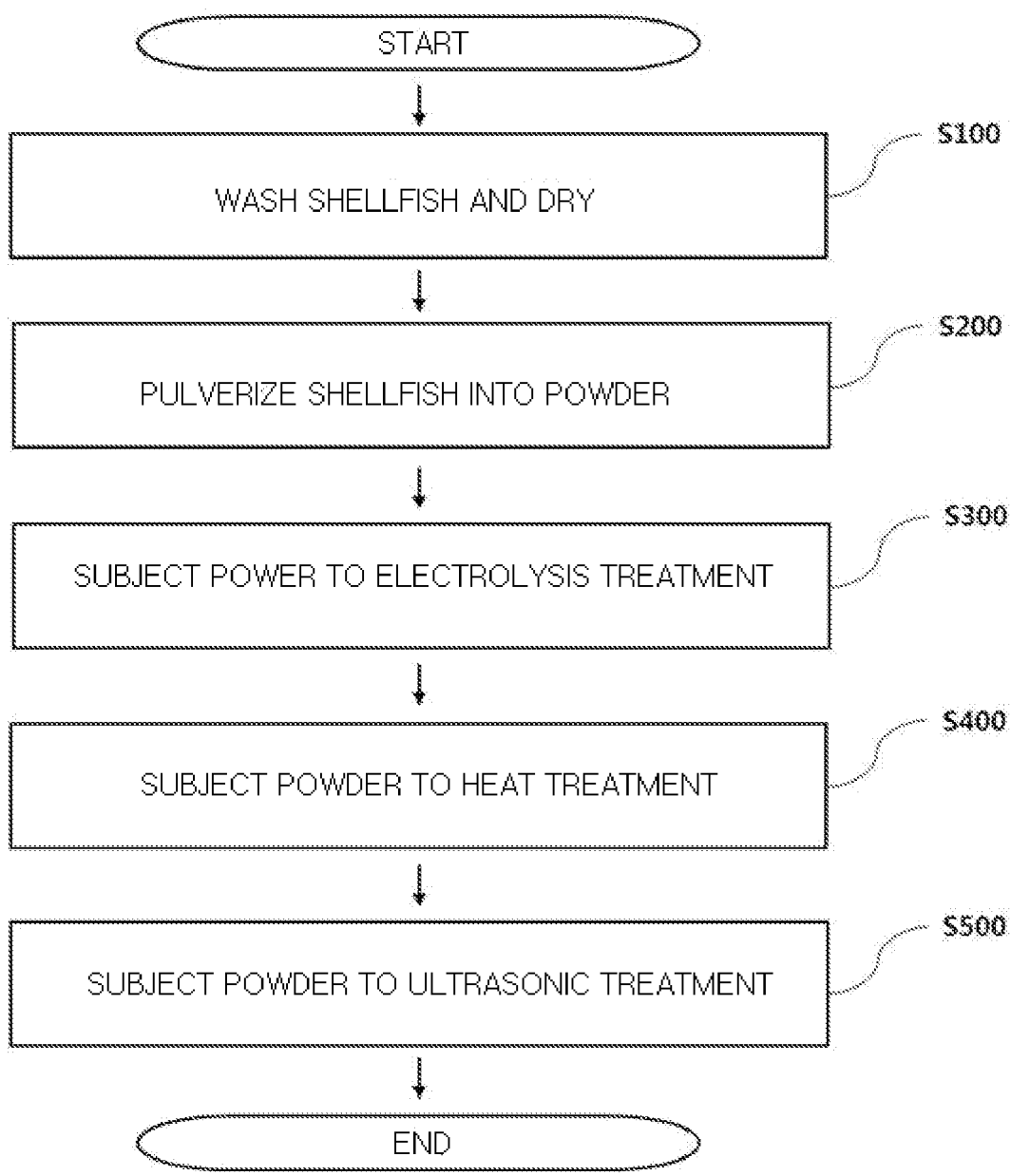

METHOD OF PREPARING IONIZED CALCIUM OXIDE POWDER

CROSS-REFERENCE TO RELATED APPLICATIONS

This patent application claims priority under 35 U.S.C. § 119 to Korean Patent Application No. 10-2020-0011175 filed on Jan. 30, 2020, the entire contents of which are incorporated by reference herein.

TECHNICAL FIELD

The present disclosure relates to a method of preparing an ionized calcium oxide powder.

BACKGROUND

Calcium is known as an inorganic element that plays an important function in plants and animals. In particular, in plants, calcium neutralizes organic acids in the plant and binds to pectin that connects the cell walls to harden the skin, strengthens against pests, helps the development of roots, and increases storage by preventing the production of ethylene gas which is a mature hormone.

Therefore, from an agricultural aspect, it is very important to make it easy to provide the calcium to plants. The calcium exists in the form of various salts on the earth, and calcium oxide (CaO) is mainly used as a form for supplying calcium to plants. The calcium oxide is also called quicklime. When dissolved in water, the calcium oxide forms calcium hydroxide ($Ca(OH)_2$) and is ionized to provide calcium ions ($Ca^{2+}$), and thus can be easily absorbed by plants. However, since calcium ions that can be provided by dissolving calcium oxide are limited, high-purity calcium oxide is required to produce as many calcium ions as possible for the same weight used.

On the other hand, in addition to being the source of calcium, the calcium oxide has very diverse uses such that it is used as the lime fertilizer, disinfectant, acid soil improver, drying agent as a moisture collector, civil construction material, raw material for bleach, acid waste gas collector, disinfectant, etc. Accordingly, there is an increasing need for a technique for obtaining high-purity calcium oxide.

In the related art, it is known that the calcium oxide is obtained by directly calcining egg shells, seaweed sediment egg masses, coral sediments containing calcium carbonate ($CaCO_3$) at a temperature of about 900° C., but since the calcium oxide produced by this method contains impurities mixed due to dust and soot and thus has a low purity, there is a problem of low amount of calcium ions provided for the same weight diluted in water.

Korean Registered Patent Publication No. 10-1463884, which is the background technology of the present disclosure, discloses a technology for producing calcium oxide powder by repeatedly performing a plurality of calcining and grinding steps using shellfish, but is insufficient to solve the above-described problem.

SUMMARY

The present disclosure is made to solve the problems of the related art described above, and provides a method of preparing ionized calcium oxide powder.

However, the technical problem to be achieved by the embodiments of the present disclosure is not limited to the technical problem as described above, and other technical problems may exist.

As a technical means for achieving the object of the present disclosure described above, a method of preparing an ionized calcium oxide powder is provided, including steps of washing and drying shellfish, pulverizing the shellfish into a powder, subjecting the powder to a heat treatment, subjecting the powder to an electrolysis treatment, and subjecting the powder to an ultrasonic treatment.

According to an exemplary embodiment, the method of preparing an ionized calcium oxide powder may be performed in an environment in which carbon dioxide is removed, but is not limited thereto.

According to an exemplary embodiment, the heat treatment may be performed under an elevated temperature condition, but is not limited thereto.

According an exemplary embodiment, the elevated temperature condition may include increasing the temperature in a range of 10° C./min to 100° C./min, but is not limited thereto.

According to an exemplary embodiment, the heat treatment may be performed in a temperature range of 1,000° C. to 3,000° C. by increasing the temperature according to the elevated temperature condition, but is not limited thereto.

According to an exemplary embodiment, the electrolysis treatment step may be performed under a boosted voltage condition, but is not limited thereto.

According an exemplary embodiment, the boosted voltage condition may include increasing the applied voltage within a range of 100 V/min to 1,000 V/min, but is not limited thereto.

According to an exemplary embodiment, the electrolysis treatment step may be performed in a voltage range of 50,000 V to 200,000 V by the increased voltage according to the boosted voltage condition, but is not limited thereto.

According to an exemplary embodiment, the heat treatment may be performed in different voltage ranges depending on the use of the calcium oxide powder, but is not limited thereto.

While certain means to solve the problems of the related art are described above, these are merely exemplary and should not be construed as limiting the present disclosure. In addition to the exemplary embodiments described above, additional embodiments may exist in the drawings and detailed description of the invention.

The method of preparing a calcium oxide according to the present disclosure uses the shellfish as a source of calcium carbonate. The shellfish has an advantage in that the content of calcium carbonate is higher than that of the egg shellfish, seaweed sediment egg masses, and coral sediments used in the related art. In addition, the preparation method is eco-friendly because it can recycle shellfish that is thrown away as aquatic waste.

The method of preparing a calcium oxide according to the present disclosure performs a pulverizing process to form fine powder particles, and accordingly, most of calcium carbonate (reactant) contained in the pulverized particles can react and be converted into calcium oxide (product). As a result, high purity calcium oxide powder with a high degree of ionization can be produced.

The method of preparing a calcium oxide according to the present disclosure may be performed under the elevated temperature condition in which the temperature is gradually increased and/or the boosted voltage condition in which the voltage is gradually increased, thereby producing a high purity calcium oxide powder.

The high-purity calcium oxide powder produced through the method of preparing a calcium oxide according to the present disclosure is easily ionized, and accordingly, has the advantage of supplying ionized calcium in a form that can be easily absorbed by humans and animals and plants, and can also be used in a variety of applications including bordeaux mixture, lime fertilizer, fungicide, acidic soil improving agent, drying agent as moisture collecting agent, civil engineering building material, raw material for bleaching agent, acid waste gas collecting agent, disinfectant, semiconductor manufacturing, etc.

However, the effect obtainable in the present disclosure is not limited to those described above, and other effects may exist.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawing, in which:

FIG. 1 is a flow chart of a method of preparing an ionized calcium oxide powder according to an exemplary embodiment.

DETAILED DESCRIPTION OF THE DISCLOSURE

Hereinafter, preferred embodiments of the present disclosure will be described in detail with reference to the accompanying drawings so that those with ordinary knowledge in the art can easily achieve the present disclosure. However, the description proposed herein is just a preferable embodiment for the purpose of illustrations only, not intended to limit the scope of the disclosure, so it should be understood that other equivalents and modifications could be made thereto without departing from the scope of the disclosure. The functions or elements in the drawings that are irrelevant to the present disclosure will not be described for the sake of clarity, and throughout the description, the like reference numerals are used to denote the same or similar elements.

Throughout the description, when a portion is stated as being "connected" to another portion, it encompasses not only when the portions are "directly connected", but also when the portions are "electrically connected" while being intervened by another element present therebetween.

Throughout the description, when one member is positioned "on", "above", "on an upper end of", "under", "beneath", and "on a lower end of" the other member, this includes not only the case where the one member is positioned in contact with the other member, but also the case where another member is present between the one and the other members.

Throughout the description, when a portion is stated as "comprising (including)" an element, unless specified to the contrary, it intends to mean that the portion may additionally include another element, rather than excluding the same.

The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. In addition, throughout the description, the term "step of ~" or "~ step" does not mean "step for ~".

Throughout the description, the term "combination thereof" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Throughout the description, the phrase "A and/or B" means "A, B, or A and B".

Hereinafter, a method of preparing a calcium oxide powder of the present disclosure will be described in detail with reference to embodiments, examples and drawings. However, the present disclosure is not limited to the following embodiments, examples, and drawings.

As a technical means for achieving the object of the present disclosure described above, a method of preparing an ionized calcium oxide powder is provided, including steps of washing and drying shellfish; pulverizing the shellfish into a powder; subjecting the powder to a heat treatment; subjecting the powder to an electrolysis treatment; and subjecting the powder to an ultrasonic treatment.

FIG. 1 is a flow chart of a method of preparing an ionized calcium oxide powder according to an exemplary embodiment.

First, the shellfish is washed and dried (S100).

The method of preparing an ionized calcium oxide according to the present disclosure uses the shellfish as a source of calcium carbonate. The shellfish has an advantage in that the content of calcium carbonate is higher than that of the egg shellfish, seaweed sediment egg masses, and coral sediments used in the related art. In addition, the preparation method is eco-friendly because it can recycle shellfish that is thrown away as aquatic waste.

The shell is composed of multiple layers, and the innermost layer, i.e., the nacreous layer contains about 95% calcium carbonate, while the surface layers contain relatively low calcium carbonate content and a large amount of impurities. Accordingly, during the washing, a process of polishing about 0.5 mm to 2 mm of the shell surface may be additionally performed to increase the purity and ionization degree of the calcium oxide powder being prepared. For the polishing, physical polishing method and/or chemical polishing method may be used.

According to an exemplary embodiment, the drying may be performed by a method selected from the group consisting of natural drying, hot air drying, cold air drying, vacuum drying, vacuum freeze drying, and combinations thereof, but is limited thereto.

Preferably, the drying may be one that is capable of minimizing mixing of impurities by performing hot air drying at 30° C. to 70° C. to shorten the drying time.

Next, the shellfish is ground (S200).

According to an exemplary embodiment, the pulverized particles may have a diameter of 1 μm to 3,000 μm, but are not limited thereto.

For example, the average diameter of the pulverized particles may be about 1 μm to about 3,000 μm, about 10 μm to about 3,000 μm, about 50 μm to about 3,000 μm, about 100 μm to about 3,000 μm, about 250 μm to about 3,000 μm, about 500 μm to about 3,000 μm, about 750 μm to about 3,000 μm, about 1,000 μm to about 3,000 μm, about 1,250 μm to about 3,000 μm, about 1,500 μm to about 3,000 μm, about 1,750 μm to about 3,000 μm, about 2,000 μm to about 3,000 μm, about 2,250 μm to about 3,000 μm, about 2,500

μm to about 3,000 μm, about 2,750 μm to about 3,000 μm, about 1 μm to about 2,000 μm, about 10 μm to about 2,000 μm, about 50 μm to about 2,000 μm, about 100 μm to about 2,000 μm, about 250 μm to about 2,000 μm, about 500 μm to about 2,000 μm, about 750 μm to about 2,000 μm, about 1,000 μm to about 2,000 μm, about 1,250 μm to about 2,000 μm, about 1,500 μm to about 2,000 μm, about 1,750 μm to about 2,000 μm, about 1 μm to about 1,500 μm, about 10 μm to about 1,500 μm, about 50 μm to about 1,500 μm, about 100 μm to about 1,500 μm, about 250 μm to about 1,500 μm, about 500 μm to about 1,500 μm, about 750 μm to about 1,500 μm, about 1,000 μm to about 1,500 μm, about 1,250 μm to about 1,500 μm, about 1 μm to about 1,000 μm, about 10 μm to about 1,000 μm, about 50 μm to about 1,000 μm, about 100 μm to about 1,000 μm, about 250 μm to about 1,000 μm, about 500 μm to about 1,000 μm, about 750 μm to about 1,000 μm, about 1 μm to about 750 μm, about 10 μm to about 750 μm, about 50 μm to about 750 μm, about 100 μm to about 750 μm, about 250 μm To about 750 μm, about 500 μm to about 750 μm, about 1 μm to about 500 μm, about 10 μm to about 500 μm, about 50 μm to about 500 μm, about 100 μm to about 500 μm, about 250 μm to about 500 μm, about 1 μm to about 250 μm, about 10 μm to about 250 μm, about 50 μm to about 250 μm, about 100 μm to about 250 μm, about 150 μm to about 250 μm, about 200 μm to about 250 μm, about 1 μm to about 200 μm, about 10 μm to about 200 μm, about 50 μm to about 200 μm, about 100 μm to about 200 μm, about 150 μm to about 200 μm, about 1 μm to about 175 μm, about 10 μm to about 175 μm, about 50 μm to about 175 μm, about 100 μm to about 175 μm, about 125 μm to about 175 μm, about 150 μm to about 175 μm, but is not limited thereto. Preferably, the average diameter of the pulverized particles may be about 250 μm to about 500 μm, but is not limited thereto.

In this regard, as the size of the powder particles decreases, the reactivity in the subsequent steps can be increased, and accordingly, most of calcium carbonate (reactant) contained in the pulverized particles can react and be converted into calcium oxide (product). As a result, high purity calcium oxide powder can be produced.

The method of preparing a calcium oxide powder according to the present disclosure may involve a first grinding of the shellfish into a powder having particles that are 3 mm to 5 mm in diameter, and a second grinding to form finer particles of the powder.

The "grinding" refers to the reduction in particle size which is resulted by applying force to solid particles to crush or cut them into small particles. The purpose of crushing the solid into small particles in the method of preparing a calcium oxide according to the present disclosure is to increase the reaction rate by increasing the surface area of the solid. The grinding can be classified into coarse, medium, and fine grinding according to the size of the ground particles, and grinding to or less than 1 micron is called ultrafine grinding.

The coarse grinding means that particles that are several tens to several tens of centimeters are ground into particles that are several centimeters, and the medium grinding means that particles that are several centimeters are ground into particles that are several μm, and the fine grinding means that particles that are several mm are ground into particles of several μm.

According to an exemplary embodiment, the first grinding may be coarse and/or medium grinding, and the second grinding may be fine grinding, but is not limited thereto.

According to an exemplary embodiment, the pulverizing may be performed by a method selected from the group consisting of roll milling, ball milling, jet milling, and combinations thereof.

According to an exemplary embodiment, the pulverizing may be performed by dry milling or wet milling, but is not limited thereto. Preferably, the pulverizing may be performed by dry milling.

The dry milling according to the present disclosure means grinding an object in the air, and the wet milling means grinding an object in water or an organic solvent. The dry milling is preferably performed in the preparation method according to the present disclosure. The dry milling has the advantage that the removal of the solvent is unnecessary and the calcium is not lost because the solvent is not added.

According an exemplary embodiment, the grinding step may further include a process of refining the powder, but is not limited thereto.

In the grinding step, dust may be mixed in the powder, and the dust may act as an impurity of the mineral solution, and thus, a refining process may be required.

When the powder is prepared by wet milling, the process of refining the powder may include steps of evaporating the water or the organic solvent containing the powder, centrifuging the powder, or filtering the water or organic solvent containing the powder, but is not limited thereto.

When the powder is prepared by dry milling, the process of refining the powder may include steps of filtering the powder, centrifuging the powder, or separating using a difference in density of the powder, but is not limited thereto.

According to an exemplary embodiment, the method of preparing an ionized calcium oxide powder may be performed in an environment in which carbon dioxide is removed, but is not limited thereto.

In particular, during electrolysis, heat treatment, or ultrasonic treatment, which will be described below, the calcium oxide and a large amount of carbon dioxide are generated from the reaction of the calcium carbonate, and the opposite reaction may occur between the produced calcium oxide and the carbon dioxide, which may form calcium carbonate.

Accordingly, the method of preparing a calcium oxide according to the present disclosure may include a device for removing carbon dioxide or a carbon dioxide removing agent. Accordingly, by effectively removing carbon dioxide generated during the preparation process and carbon dioxide in the air to prevent the opposite reaction, it is possible to improve the yield and purity of the produced calcium oxide. In addition, by removing the carbon dioxide, the reaction can continue according to Le Chatelier's principle, rather than reaching equilibrium and being stopped.

Next, the powder is subjected to heat treatment (S300).

According to an exemplary embodiment, the heat treatment may be performed under an elevated temperature condition, but is not limited thereto. In this regard, the elevated temperature condition means that the temperature of the powder is increased at a predetermined rate for a predetermined time.

According an exemplary embodiment, the elevated temperature condition may include increasing the temperature in a range of 10° C./min to 100° C./min, but is not limited thereto. The rate of temperature increase in the elevated temperature condition may be, for example, 10° C./min to 100° C./min, 20° C./min to 90° C./min, 30° C./min to 80° C./min, 40° C./min to 70° C./min, 20° C./min to 100° C./min, 30° C./min to 100° C./min, 40° C./min to 100° C./min, 50° C./min to 100° C./min, 10° C./min to 90° C./min, 10° C./min to 80° C./min, 10° C./min to 70° C./min, 10° C./min to 60° C./min, 10° C./min to 50° C./min, and preferably about 50° C./min, but is not limited thereto.

According to an exemplary embodiment, the heat treatment may be performed in a temperature range of 1,000° C. to 3,000° C. by increasing the temperature according to the elevated temperature condition, but is not limited thereto. In this regard, a condition in which the temperature is elevated and maintained at a constant value is defined to be a constant temperature condition. For example, the temperature range may be 1,000° C. to 3,000° C., 1,500° C. to 2,500° C., 1,500° C. to 3,000° C., 2,000° C. to 3,000° C., 1,000° C. to 2,500° C., 1,000° C. to 2,000° C., and preferably about 2,000° C., but is not limited thereto.

By the heat treatment under the elevated temperature condition, heat may be evenly transferred to the entire powder. However, by the heat treatment under the constant temperature condition, heat is intensively transferred to the region of the powder that is close to the heat source and not transferred to the region of the powder far from the electrode, so that the chemical bonds of the material forming the powder may not be effectively weakened. Therefore, the step of heat treatment may further include a process of agitating while supplying heat.

In the method of preparing a calcium oxide powder according to the present disclosure, the heat treatment is performed at a high temperature (1,000° C. or higher) compared to the related method, so that high purity and high ionization degree calcium oxide powder can be prepared.

According to an exemplary embodiment, the heat treatment may be performed in different temperature ranges depending on the use of the calcium oxide powder, but is not limited thereto. For example, the heat treatment may be performed at 1,800° C. to 2,000° C. when the use of the calcium oxide powder is for drinking water, food, and medicine, and at 1,600° C. to 1,800° C. when the use is for animals and plants, and under the constant temperature condition of 1,500° C. to 1,600° C. when the use is for wastewater purification and soil improvement.

According to an exemplary embodiment, the heat treatment may be performed under the constant temperature condition maintained for 30 to 120 minutes, but is not limited thereto.

Next, the powder is subjected to electrolysis treatment (S400).

According to an exemplary embodiment, the electrolysis treatment step may be performed under a boosted voltage condition, but is not limited thereto. The boosted voltage condition means that the applied voltage is increased at a constant rate for a predetermined time. In this regard, a condition in which the voltage is increased and maintained at a constant value is defined to be a constant voltage condition.

The voltage may be evenly applied to the entire powder when the electrolysis treatment is performed under the boosted voltage condition. However, when the electrolysis treatment is performed under the constant voltage condition, the voltage application is focused at a region of the powder that is close to the electrode, while the voltage is not applied to a region of the powder that is farther away from the electrode, so that the chemical bonding of the material constituting the powder may not be effectively weakened. Therefore, the electrolysis treatment step may further include agitating while applying a voltage.

According an exemplary embodiment, the boosted voltage condition may include increasing the applied voltage within a range of 100 V/min to 1,000 V/min, but is not limited thereto.

According an exemplary embodiment, the boosted voltage condition may include increasing the applied voltage within a range of 100 V/min to 1,000 V/min, but is not limited thereto. For example, the boosted voltage condition may be 100 V/min to 1,000 V/min, 200 V/min to 900 V/min, 300 V/min to 800 V/min, 400 V/min to 600 V/min, 200 V/min to 1,000 V/min, 300 V/min to 1,000 V/min, 400 V/min to 1,000 V/min, 500 V/min to 1,000 V/min, 100 V/min to 900 V/min, 100 V/min to 800 V/min, 100 V/min to 700 V/min, 100 V/min to 600 V/min, 100 V/min to 500 V/min, and preferably 500 V/min, but is not limited thereto.

According to an exemplary embodiment, the electrolysis treatment step may be performed in a voltage range of 50,000 V to 200,000 V by the increased voltage according to the boosted voltage condition, but is not limited thereto. For example, the voltage range may be 50,000 V to 200,000 V, 60,000 V to 190,000 V, 70,000 V to 180,000 V, 80,000 V to 170,000 V, 90,000 V to 160,000 V, 100,000 V to 150,000 V, 110,000 V to 140,000 V, 60,000 V to 200,000 V, 70,000 V to 200,000 V, 80,000 V to 200,000 V, 90,000 V to 200,000 V, 100,000 V to 200,000 V, 110,000 V to 200,000 V, 120,000 V to 200,000 V, 50,000 V to 190,000 V, 50,000 V to 180,000 V, 50,000 V to 170,000 V, 50,000 V to 160,000 V, 50,000 V to 150,000 V, 50,000 V to 140,000 V, 50,000 V to 130,000 V, 50,000 V to 120,000 V, and preferably 120,000 V, but is not limited thereto.

The electrolysis treatment may involve simultaneously supplying both electrical energy and thermal energy to the powder.

By the electrolysis treatment with the application of high voltage on the powder, the chemical bonding force in the powder can be weakened, thereby increasing the reactivity and yield of a reaction in which calcium carbonate is converted to calcium oxide. In addition, the weakening binding force can result in an increased reactivity of the reactants. Accordingly, a calcium oxide powder having a high degree of ionization can be prepared.

According to an exemplary embodiment, the electrolysis may be performed in different voltage ranges depending on the use of the calcium oxide powder, but is not limited thereto.

The electrolysis treatment includes not only the electrolysis in a general sense, but also any method without limitation, as long as it is a method of inducing weakening of chemical bonds and decomposition by the application of the voltage.

For example, the electrolysis treatment may be performed using an electric furnace. In the case of using the electric furnace, the powder may be put in a heat-resistant container and put into the electric furnace, but is not limited thereto. Accordingly, it is possible to solve a problem caused by the direct heating, that is, the mixing of the soot or the like and reduced purity and difficulty of obtaining white powder.

According to an exemplary embodiment, the electric furnace may be selected from the group consisting of an arc furnace, a resistance furnace, an induction furnace, an electron beam furnace, and combinations thereof, but is not limited thereto.

The electric furnace according to the method of preparing a calcium oxide powder of the present disclosure can easily control temperature and components. In addition, since the electric furnace has excellent thermal efficiency, efficient heat supply is possible.

The power supplied to the electric furnace may be either direct current or alternating current. There may be three upper electrodes for a 3-phase AC electric furnace and one upper electrode for a DC electric furnace, but not limited thereto.

The electric furnace includes transformer equipment for converting electricity as a main heat source into an appropriate voltage or form (direct/alternating currents), a basket for charging scrap iron as a main raw material, a hopper for charging auxiliary materials, a dust collector for removing dust generated during operation, and water cooling equipment. By employing the dust collector, it is possible to minimize the mixing of dust, and by employing the water cooling equipment, it is possible to control temperature with ease.

The electrode of the electric furnace may include graphite. Considering insufficient resources of the natural graphite and the high unit price thereof, artificial graphite may be used, which is crystallized by further carbonizing bitumen, tar, etc., and heating with high heat. The electrodes are consumable, as they are gradually sublimated and consumed by the exposure to ultra-high temperature during operation, and may be broken by thermal stress or collided with scrap metal that collapses while melting.

According to an exemplary embodiment, the electric furnace may be under an atmosphere selected from the group consisting of vacuum, atmospheric, oxidizing, non-oxidizing, inert, and combinations thereof, but is not limited thereto. Preferably, the electric furnace may be under the vacuum atmosphere.

Next, the powder is subjected to ultrasonic treatment (S500).

By the ultrasonic treatment, the purity of calcium oxide produced by reacting the calcium carbonate remaining unreacted in the previous step can be increased.

According to an exemplary embodiment, the frequency of the ultrasonic wave may be 0.1 MHz to 20 MHz, but is not limited thereto.

The ultrasonic waves pass through the inside of a medium and generate heat energy. In the preparation method according to the present disclosure, the powder may be heated within a short time by emitting ultrasonic waves to transmit high energy. When heated with the high temperature for a long time, the produced calcium oxide particles may be calcined to increase the size of the particles, but the preparation method according to the present disclosure can prevent calcining of the particles by applying high heat to the powder within a short time by using ultrasonic waves.

According to an exemplary embodiment, the step of heat treatment of the powder, the step of electrolysis treatment of the powder, and the step of ultrasonic treatment of the powder may not be determined in certain order, but are not limited thereto. For example, the steps may be performed in the order of the heat treatment of the powder, the electrolysis treatment of the powder, and the ultrasonic treatment of the powder; the heat treatment of the powder, the ultrasonic treatment of the powder, and the electrolysis treatment of the powder; the electrolysis treatment of the powder, the heat treating of the powder, and the electrolysis treatment of the powder; the electrolysis treatment of the powder, the heat treatment of the powder, and the ultrasonic treatment of the powder; the electrolysis treatment of the powder, the ultrasonic treatment of the powder, and the heat treatment of the powder; the ultrasonic treatment of the powder, the heat treatment of the powder, and the electrolysis treatment of the powder; the ultrasonic treatment of the powder, the electrolysis treatment of the powder, and to heat treatment of the powder, although not limited thereto.

According to an exemplary embodiment, after the ultrasonic treatment, a step of forming nanoparticles of the prepared powder may be additionally performed. The forming of nanoparticles may be performed by dispersing the powder in an aqueous solution and performing wet milling. The wet milling is capable of finer grinding than dry milling.

In this regard, the size of the powder particles may be controlled to suit the application. In addition, because the powder particles in smaller size can be dissolved better in water and the like, thus facilitating ionization, the calcium oxide powder produced by the preparation method according to the present disclosure can provide calcium ions easily.

According to an exemplary embodiment, a purification step for increasing purity may be additionally performed after the step of forming nanoparticles, but is not limited thereto.

According to an exemplary embodiment, the purification may be performed by a method selected from the group consisting of filtration, precipitation, recrystallization, fractional distillation, chromatography, centrifugation, solvent extraction, dialysis, adsorption, electrolysis, and combinations thereof, but is not limited thereto.

While certain means to solve the problems of the related art are described above, these are merely exemplary and should not be construed as limiting the present disclosure. In addition to the exemplary embodiments described above, additional embodiments may exist in the drawings and detailed description of the invention.

Example

Natural ark clam shells collected from the southern coast of Korea were washed, dried with hot air, and then ground into powder having an average diameter of about 3 mm using a grinder. Thereafter, the first ground ark clam shell was secondarily ground through a milling process to form a fine powder having an average diameter of about 500 μm.

Next, the fine powder was subjected to heat treatment. For the heat treatment, temperature was gradually increased under the elevated temperature condition of 50° C./min and maintained at a final temperature of 2,000° C. for 50 minutes.

Next, the heat-treated powder was subjected to electrolysis treatment. Specifically, voltage was gradually increased under the boosted voltage condition of about 500 V/min to finally reach a voltage of 120,000 V. Thereafter, the voltage was maintained for 30 minutes.

Thereafter, ultrasonic waves were emitted to the heat-treated powder for 10 minutes so that a calcium oxide powder was produced.

Comparative Example 1

A calcium oxide powder was prepared in the same manner as in the above example, except that the electrolysis treatment was omitted.

Comparative Example 2

A calcium oxide powder was prepared in the same manner as in the above example, except that the process of emitting ultrasonic waves was omitted.

Comparative Example 3

A calcium oxide powder was prepared in the same manner as in the above example, except that the electrolysis treatment was performed for 30 minutes under the constant voltage condition of 120,000 V without the boosted voltage condition.

Comparative Example 4

A calcium oxide powder was prepared in the same manner as in the above example, except that the heat treatment was performed for 50 minutes at the constant temperature condition of 2,000° C. without elevated temperature condition.

Comparative Example 5

A calcium oxide powder was prepared in the same manner as in the above example, except that the ultrasonic waves were emitted for 1 hour.

Experimental Example 1 g of the calcium oxide powder according to the example and comparative examples of the present disclosure was dissolved in 1 liter of distilled water to measure the pH. The pH values are shown in Tables 1 to 3 below.

TABLE 1

|    | Example | Comp. Ex. 1 | Comp. Ex. 2 |
|----|---------|-------------|-------------|
| pH | 13.4    | 9.8         | 10.1        |

Referring to Table 1, since the purity of calcium oxide produced by the electrolysis treatment and the ultrasonic treatment is high, when the calcium oxide powder of the same weight was dissolved in water, it was observed that more $Ca(OH)_2$ was produced, resulting in a higher pH value.

TABLE 2

|    | Example | Comp. Ex. 3 | Comp. Ex. 4 |
|----|---------|-------------|-------------|
| pH | 13.4    | 9.6         | 9.2         |

Referring to Table 2, since the purity of calcium oxide produced by the elevated temperature condition and the boosted voltage condition is high, when the calcium oxide powder of the same weight was dissolved in water, it was observed that more $Ca(OH)_2$ was produced, resulting in a higher pH value.

TABLE 3

|    | Example | Comp. Ex. 5 |
|----|---------|-------------|
| pH | 13.4    | 10.3        |

Referring to Table 3, since the purity of calcium oxide produced by emitting the ultrasonic waves for a short time is high, when the calcium oxide powder of the same weight was dissolved in water, it was observed that more $Ca(OH)_2$ was produced, resulting in a higher pH value.

The foregoing description of the present disclosure is for illustrative purposes only, and those of ordinary skill in the art to which the present disclosure pertains will be able to understand that other specific forms can be easily modified without changing the technical spirit or essential features of the present disclosure. Therefore, it should be understood that the embodiments described above are illustrative and non-limiting in all respects. For example, each component described as a single type may be implemented in a distributed manner, and similarly, components described as being distributed may also be implemented in a combined form.

While the scope of the present disclosure is represented by the claims accompanying below, the meaning and the scope of the claims, and all the modifications or modified forms that can be derived from the equivalent concepts will have to be interpreted as falling into the scope of the present disclosure.

What is claimed is:

1. A method of preparing an ionized calcium oxide powder, comprising steps of:
   washing and drying shellfish;
   pulverizing the shellfish into a powder;
   subjecting the powder to a heat treatment;
   subjecting the powder to an electrolysis treatment; and
   subjecting the powder to an ultrasonic treatment, wherein
   the heat treatment is performed under an elevated temperature condition to increase a temperature within a range of 10° C./min to 100° C./min,
   the electrolysis treatment is performed under a boosted voltage condition to increase an applied voltage within a range of 100 V/min to 1,000 V/min, and performed in an environment in which carbon dioxide is removed.

2. The method of claim 1, wherein the heat treatment is performed in a temperature range of 1,000° C. to 3,000° C. by increasing the temperature according to the elevated temperature condition.

3. The method of claim 1, wherein the electrolysis treatment is performed in a voltage range of 50,000 V to 200,000 V by increasing the voltage according to the boosted voltage condition.

* * * * *